(12) United States Patent
Drescher et al.

(10) Patent No.: US 10,817,504 B2
(45) Date of Patent: Oct. 27, 2020

(54) CONSTRAINT SATISFACTION SOFTWARE TOOL FOR DATABASE TABLES

(71) Applicant: SAP SE, Walldorf (DE)

(72) Inventors: Conrad Drescher, Heidelberg (DE); Mirko Rahn, Kaiserslautern (DE)

(73) Assignee: SAP SE, Walldorf (DE)

( * ) Notice: Subject to any disclaimer, the term of this patent is extended or adjusted under 35 U.S.C. 154(b) by 268 days.

(21) Appl. No.: 15/940,372

(22) Filed: Mar. 29, 2018

(65) Prior Publication Data

US 2019/0303472 A1    Oct. 3, 2019

(51) Int. Cl.
*G06F 16/23* (2019.01)
*G06F 16/22* (2019.01)
*G06F 16/2455* (2019.01)

(52) U.S. Cl.
CPC ........ *G06F 16/2365* (2019.01); *G06F 16/221* (2019.01); *G06F 16/2282* (2019.01); *G06F 16/24565* (2019.01)

(58) Field of Classification Search
CPC .................................................. G06F 16/2365
See application file for complete search history.

(56) References Cited

U.S. PATENT DOCUMENTS

| | | | |
|---|---|---|---|
| 2002/0059187 A1 | 5/2002 | Delo et al. | |
| 2009/0292711 A1* | 11/2009 | Konik | G06F 16/24565 |
| 2013/0117255 A1* | 5/2013 | Liu | G06F 16/2456 |
| | | | 707/714 |
| 2015/0106382 A1* | 4/2015 | Liu | G06F 16/221 |
| | | | 707/744 |
| 2018/0024901 A1* | 1/2018 | Tankersley | G06Q 10/06393 |
| | | | 707/694 |

OTHER PUBLICATIONS

European Search Report received in EP Application No. 19165484. 7, dated Aug. 16, 2019, 14 pages.
Fehily, "SQL Visual QuickStart Guide: Retrieving Data from a Table," Retrieved from http://www.peachpit.com/articles/article. aspx?p=1276352&seqNum=3, Jan. 5, 2009, 2 pages.

(Continued)

*Primary Examiner* — Mark D Featherstone
*Assistant Examiner* — Tony Wu
(74) *Attorney, Agent, or Firm* — Klarquist Sparkman, LLP

(57) ABSTRACT

Techniques and solutions are provided for analyzing constraints. A disclosed embodiment provides for determining whether a table contains a valid tuple, and if so, the minimum index of the first valid tuple. Determining whether the table contains a valid tuple can provide an early indication of whether a set of constraints is violated or entailed, for positive and negative constraints, respectively. Determining the minimum index of the first valid tuple can expedite subsequent constraint analysis. Further disclosed embodiments provide for removal of duplicate and wildcard values from a set of constraints, which can facilitate negative constraint analysis. An indication can be provided, such as through a user interface, of whether a set of constraints is violated or entailed. Software can restrict selection of values that may result in constraint violation based on the provided indication.

20 Claims, 14 Drawing Sheets

(56) References Cited

OTHER PUBLICATIONS

Bitton et al., "Duplicate record elimination in large data files," ACM Transactions on Database Systems, ACM, New York, NY, vol. 8, No. 2, Jun. 1, 1983, pp. 255-265.

Lecoutre, C. et al., "Improving the lower bound of simple tabular reduction," retrieved from https://link.springer.com/article/10.1007/s10601-014-9171-9 on or before Jan. 2018, 9 pp.

Lecoutre, C., "STR2: optimized simple tabular reduction for table constraints," retrieved from https://link.springer.com/article/10.1007/s10601-011-9107-6 on or before Jan. 2018, 31 pp.

Gulwani, S. et al., "Program Analysis as Constraint Solving," retrieved from https://www.microsoft.com/en-us/research/wp-content/uploads/2016/12/pldi08_cs.pdf on or before Jan. 2018, 12 pp.

Marriott, K. et al., "Negative Boolean constraints," retrieved from https://www.sciencedirect.com/science/article/pii/030439759500209X on or before Jan. 2018, 16 pp.

Li, H. et al., "Making Simple Tabular Reduction Works on Negative Table Constraints," retrieved from https://pdfs.semanticscholar.org/8057/f234d2f1b3591cffeb8d651e15e1043fd78d.pdf on or before Jan. 2018, 2 pp.

Hauptmann, "Introduction to Variant Configuration with an example model," retrieved from https://wiki.scn.sap.com/wiki/display/PLM/Introduction+to+Variant+Configuration+with+an+example+model on or before Jan. 2018, 11 pp.

Blumöhr et al., "Variant Configuration with SAP," retrieved from https://www.sap-press.com/variant-configuration-with-sap_2889/ on or before Jan. 2018, 52 pp.

Kumbum, R., "Variant Configuration," retrieved from https://www.slideshare.net/KUMBUM/sap-variant-configuration-34736665 on or before Jan. 2018, 84 pp.

Ullmann, J., "Partition search for non-binary constraint satisfaction," retrieved from http://cse.unl.edu/~choueiry/Documents/Ullmann2007-GAC.pdf on or before Jan. 2018, 40 pp.

Wallace, M., "Practical Applications of Constraint Programming," retrieved from https://link.springer.com/article/10.1007/BF00143881 on or before Jan. 2018, 30 pp.

* cited by examiner

FIG. 1

| Feature | Condition |
|---|---|
| Characteristic A | 1 IF (FIELD X1 == Y2) ELSE 3 |
| Object CAR | TABLE CAR_POWER (ENGINE = CAR.ENGINE, CAR.BATTERY) |
| Characteristic C | {1, 2, 3, 4, 5} |
| Characteristic D | COLOR != 'RED' |
| Characteristic E | = Mass * Acceleration |
| Characteristic F | SELECT COL2 * FROM TABLE Z3 |
| Characteristic G | {A1, B1, C1} IF Characteristic C == {1,3,5} ELSE {A2, B2, C2} |
| Characteristic H | * |

| ENGINE | BATTERY |
|---|---|
| 4 Cylinder | 12 V |
| 6 Cylinder | 14 V |

| Characteristic A | Characteristic B | Characteristic C | Characteristic D | Engine | Battery |
|---|---|---|---|---|---|
| 1 | STANDARD | ? | BLUE | ? | 14V |
| | | 3 | RED | | |

| Index = 0 | x : {1 , 2} | y : {1 , 2} | z : {1 , 2} |
| --- | --- | --- | --- |
| 202 | 0 | 0 | 0 |
| | 0 | 0 | 0 |
| | 0 | 1 | 0 |
| | 0 | 2 | 2 |
| | 1 | 0 | 1 |
| | 1 | 1 | 2 |

FIG. 2A

| | x : {1 , 2} | y : {1 , 2} | z : {1 , 2} |
| --- | --- | --- | --- |
| 202 | 0 | 0 | 0 |
| | 0 | 0 | 0 |
| | 0 | 1 | 0 |
| | 0 | 2 | 2 |
| Index = 5 | 1 | 0 | 1 |
| | 1 | 1 | 2 |

FIG. 2B

| | x : {1 , 2} | y : {1 , 2} | z : {1 , 2} |
| --- | --- | --- | --- |
| 202 | 0 | 0 | 0 |
| | 0 | 0 | 0 |
| | 0 | 1 | 0 |
| | 0 | 2 | 2 |
| Index = 5 | 1 | 0 | 1 |
| | 1 | 1 | 2 |

FIG. 2C

| x : {1 , 2} | y : {1 , 2} | z : {1 , 2} |
|---|---|---|
| 0 | 0 | 0 |
| 0 | 0 | 0 |
| 0 | 1 | 0 |
| 0 | 2 | 2 |
| 1 | 0 | 1 |
| 1 | 1 | 2 |

FIG. 2D

| x : {1 , 2} | y : {1 , 2} | z : {1 , 2} |
|---|---|---|
| 0 | 0 | 0 |
| 0 | 0 | 0 |
| 0 | 1 | 0 |
| 0 | 2 | 2 |
| 1 | 0 | 1 |
| 1 | 1 | 2 |

FIG. 2E

| x : {1 , 2} | y : {1 , 2} | z : {1 , 2} |
|---|---|---|
| 0 | 0 | 0 |
| 0 | 0 | 0 |
| 0 | 1 | 0 |
| 0 | 2 | 2 |
| 1 | 0 | 1 |
| 1 | 1 | 2 |

FIG. 2F

|   | x : {1 , 2} | y : {1 , 2} | z : {1 , 2} |
|---|---|---|---|
| 202 → | 0 | 0 | 0 |
|   | 0 | 0 | 0 |
|   | 0 | 1 | 0 |
|   | 0 | 2 | 2 |
|   | 1 | 0 | 1 |
| Index = 6 | 1 | 1 | 2 |
|   | ... | ... | ... |

FIG. 2G

| Index = 0 | x : {1 , 2} | y : {1 , 2} |
|---|---|---|
|   | 1 | 0 |
|   | 0 | 1 |
|   | 2 | 0 |

|   | x : {1 , 2} | y : {1 , 2} |
|---|---|---|
| Index = 1 | 1 | 0 |
|   | 0 | 1 |
|   | 2 | 0 |

| x : {1 , 2} | y : {1 , 2} |
|---|---|
| 1 | 0 |
| 0 | 1 |
| 2 | 0 |

Index = 1  302

FIG. 3C

| x : {1 , 2} | y : {1 , 2} |
|---|---|
| 1 | 0 |
| 0 | 1 |
| 2 | 0 |

Index = 2  302

FIG. 3D

| x : {1 , 2} | y : {1 , 2} |
|---|---|
| 1 | 0 |
| 0 | 1 |
| 2 | 0 |

Index = 2  302

FIG. 3E

| x : {1 , 2} | y : {1 , 2} |
|---|---|
| 1 | 0 |
| 0 | 1 |
| 2 | 0 |

Index = 3

FIG. 3F

| x : {1 , 2} | y : {1 , 2} |
|---|---|
| 1 | 0 |
| 0 | 1 |
| 2 | 0 |

Index = 3

FIG. 3G

| x : {1 , 2} | y: {1 , 2} |
|---|---|
| 1 | 0 |
| 0 | 1 |
| 2 | 0 |

Index = 4

FIG. 3H

| x : {1 , 2} | y : {1 , 2} | z : {1 , 2} |
|---|---|---|
| 1 | 1 | 2 |
| 1 | 1 | 1 |
| 0 | 0 | 2 |
| 2 | 1 | 0 |
| 0 | 2 | 2 |
| 1 | 1 | 2 |
| 1 | 0 | 1 |
| 0 | 0 | 2 |
| 2 | 1 | 0 |

{1, 2, 3, 4, 5, 6, 7, 8, 9} — 420

| x : {1 , 2} | y : {1 , 2} | z : {1 , 2} |
|---|---|---|
| 0 | 0 | 2 |
| 0 | 0 | 2 |
| 0 | 2 | 2 |
| 1 | 0 | 1 |
| 1 | 1 | 1 |
| 1 | 1 | 2 |
| 1 | 1 | 2 |
| 2 | 1 | 0 |
| 2 | 1 | 0 |

{3, 8, 5, 7, 2, 1, 6, 4, 9} — 424

| x : {1 , 2} | y : {1 , 2} | z : {1 , 2} |
|---|---|---|
| 0 | 0 | 2 |
| 0 | 2 | 2 |
| 1 | 0 | 1 |
| 1 | 1 | 1 |
| 1 | 1 | 2 |
| 2 | 1 | 0 |

{3, 5, 7, 2, 1, 4} — 434

510 →

| x | y | z |
|---|---|---|
| 0 | * | a |

| x | z |
|---|---|
| 0 | a |

| x : {1, 2} | y : {1, 2} | z : {1, 2} |
|---|---|---|
| 1 | 1 | * |
| 1 | 1 | 1 |
| * | 1 | * |
| * | 2 | * |
| 1 | * | 1 |
| 2 | 2 | 2 |

FIG. 6A

| x : {1, 2} | y : {1, 2} | z : {1, 2} |
|---|---|---|
| * | 1 | * |
| * | 2 | * |

620 →

| x : {1, 2} | y : {1, 2} | z : {1, 2} |
|---|---|---|
| 1 | 1 | * |

622 →

| x : {1, 2} | y : {1, 2} | z : {1, 2} |
|---|---|---|
| 1 | * | 1 |

← 624

| x : {1, 2} | y : {1, 2} | z : {1, 2} |
|---|---|---|
| 1 | 1 | 1 |
| 2 | 2 | 2 |

| y : {1, 2} |
|---|
| 1 |
| 2 |

632 →

| x : {1, 2} | y : {1, 2} |
|---|---|
| 1 | 1 |

| x : {1, 2} | z : {1, 2} |
|---|---|
| 1 | 1 |

← 634

| x : {1, 2} | y : {1, 2} | z : {1, 2} |
|---|---|---|
| 1 | 1 | 1 |
| 2 | 2 | 2 |

| x {0,1} | y {0,1} | z{0,1} |
|---|---|---|
| 0 | * | * |
| * | 0 | 1 |
| 1 | * | 0 |

| x {0,1} |
|---|
| 0 |

| y {0,1} | z {0,1} |
|---|---|
| 0 | 1 |

724

722

| x {0,1} | z {0,1} |
|---|---|
| 1 | 0 |

FIG. 7B

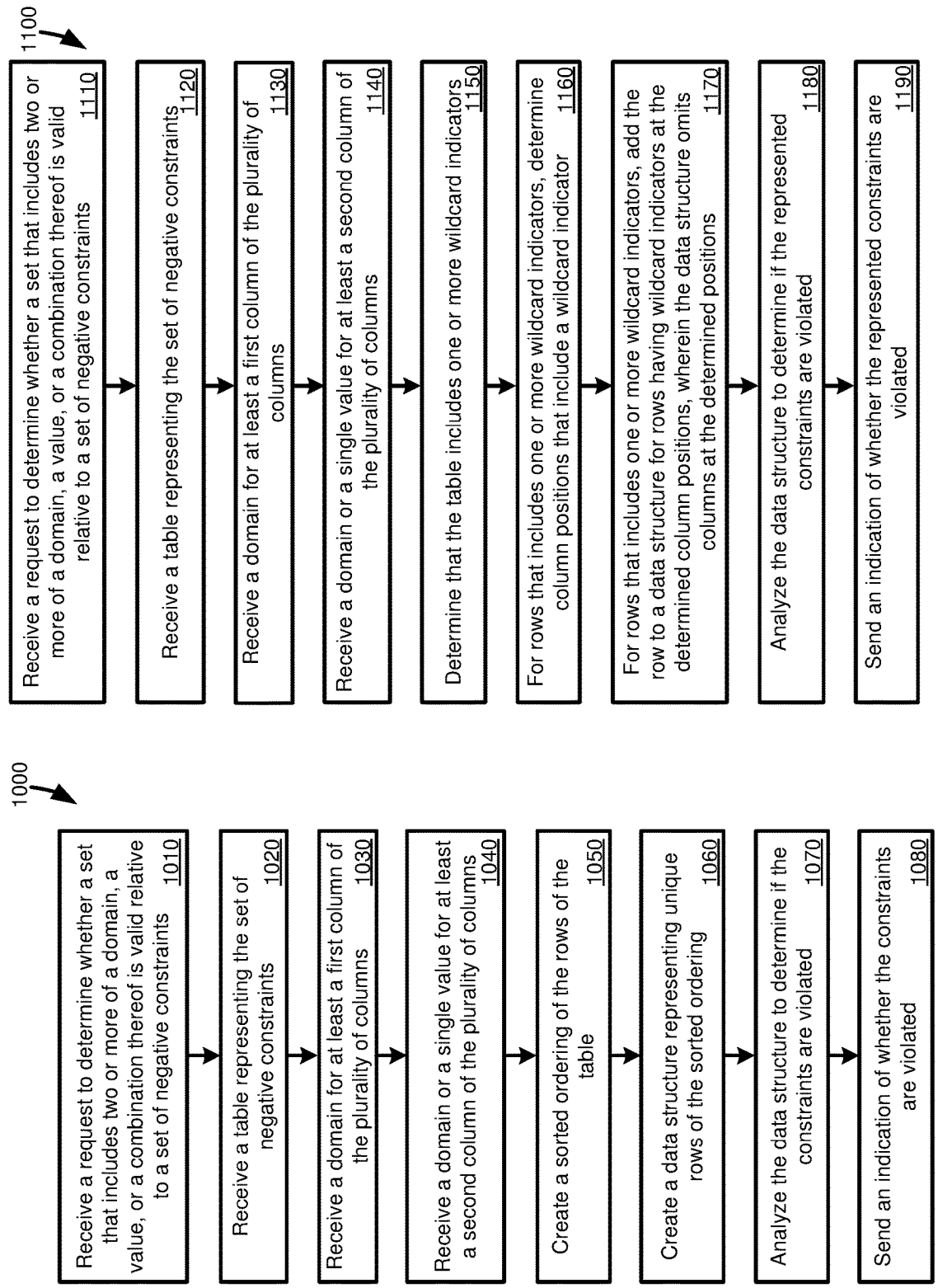

CONSTRAINT SATISFACTION SOFTWARE TOOL FOR DATABASE TABLES

FIELD

The present disclosure generally relates to analyzing constraints, such as constraints that can be expressed in tabular form. Particular implementations relate to determining the first row of valid values of a table of negative constraints or a table of positive constraints. Further implementations related to removing duplicate and wildcard values from negative constraints tables to facilitate their analysis.

BACKGROUND

In many scenarios, a variety of characteristics can be used to model or analyze an object. However, only certain combinations of characteristic values may be permitted. For example, in modelling a car, there may be a finite number of colors in which the car may be available. While in theory perhaps a car could be of any color, in a manufacturing scenario, a color value that is not one of the available color values represents an invalid specification for the car.

Similarly, characteristics of an object may be interrelated. Continuing the example of a car, if a car type of "standard transmission" is selected, that may narrow down other drive train choices to a subset, including a single value, of drive train components that were initially available when the type of transmission had not yet been selected. Similarly, if "clutch pedal" is selected as a component for the car, the only type of transmission that may be selected for the car might be "standard transmission."

Thus, characteristics may have a range, or domain, of values. However, only certain combinations of characteristic values, even when the values are within an initial domain, may be valid. For complex objects, such as cars, there may be a very large number of components used to produce the car, each of which may have a range or domain of values, and various interrelations with other components.

When a user is instantiating an object (e.g., designing a new car or placing an order for a new car), it can be important that the user's choice represents valid selections. Otherwise, problems can arise, such as an inability to assemble the car, or engineering failures that can result in loss of life, property, and potential liability.

Typical systems to analyze configuration values in view of constraints, such as to determine whether a set of values is valid or identify possible available values, can suffer from a number of problems. For example, particularly when there are a large number of characteristics or constraints, the processing time can be comparatively long, which may be inconvenient or impractical for a user. In some cases, an analysis system may not be able to perform an analysis until values have been assigned to all of the characteristics. If a significant amount of time was spent selecting the constraint values, it can be frustrating for a user to then learn that their selections were invalid. Also, the user may not be provided with feedback as to the source of a constraint violation, which does not assist the user in remedying the problem.

Configuration analysis systems may also be subject to erroneous determinations, including false positive or false negative results in certain scenarios. Configuration analysis systems may be incapable of correctly processing certain kinds of constraints, constraint values, or specifications of constraints (e.g., constraints that include wildcard values, negative constraints, or duplicate constraint specifications).

Thus, room for improvement exists in analyzing constraints, including constraints that can be specified in a tabular form.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for analyzing constraints. A disclosed embodiment provides for determining whether a table contains a valid tuple, and if so, the minimum index of the first valid tuple. Determining whether the table contains a valid tuple can provide an early indication of whether a set of constraints is violated or entailed, for positive and negative constraints, respectively. Determining the minimum index of the first valid tuple can expedite subsequent constraint analysis. Further disclosed embodiments provide for removal of duplicate and wildcard values from a set of constraints, which can facilitate negative constraint analysis. An indication can be provided, such as through a user interface, of whether a set of constraints is violated or entailed. Software can restrict selection of values that may result in constraint violation based on the provided indication.

According to one aspect, a method is provided for determining the minimum index of a first valid tuple of a table representing a set of constraints. A request is received to determine whether a set that includes two or more of a domain, a value, or a combination thereof, are valid or invalid with respect to a set of constraints. The values or domains can represent values or domains for characteristics associated with a particular object type, and can include values provided through user input, or in response to an API call.

A table is received that represents the set of constraints. The table includes a plurality of rows and a plurality of columns, respectively associated with row IDs and column IDs. The rows and columns may also have indices, which can be the same or different than the row IDs and column IDs. The indices can represent the position of the row or column in the table (e.g., the first row, second row, etc., or the first column, second column, etc., where rows are typically given indices from top to bottom and columns are given indices left to right).

A domain is received for at least a first column of the plurality of columns. The domain includes a plurality of values that represent valid values for the at least a first column. In the case of positive constraints, a valid value can be a value that does not result in a violation of the constraint. In the case of negative constraints, a valid value can be a value that results in a violation of the constraint. A domain or single value is received for at least a second column of the plurality of columns, where the domain or single value represents one or more valid values for the at least a second column. The domains/single values can be received, for example, from user input, or via an API call.

The rows of a first selected column, which can be the first column, the second column, or another column, are sequentially analyzed to determine a first row of the plurality of rows having a value matching a value, or being within the domain, of the first selected column. A putative minimum index of a first valid tuple for the table is set as the index of the determined first row. A value of the second selected column at the first determined row is analyzed to determine if the value matches a value, or is within a domain, of the second selected column.

A value of the minimum index of the first valid tuple is determined as the index of a row of the plurality of rows where column values for the row match a value, or are within a domain, of the respective columns, or determining that the table does not comprise a valid tuple. An indication is sent as to whether the set of constraints is violated (including in the case of positive constraints) or entailed (including in the case of negative constraints). The indication can be of an affirmative violation or entailment, or a current indication of no violation or no entailment.

According to another aspect, a method is provided for removing duplicate rows from a table, such as a negative constraint table that is to be analyzed in view of current values or domains, such as values or domains of features, where columns of the constraint table correspond to features. A request is received to determine whether a set that includes two or more of a domain, a value, or a combination thereof, are valid or invalid with respect to a set of negative constraints. A table representing the set of negative constraints is received. The table includes a plurality of rows and a plurality of columns, which can be associated with row IDs and column IDs, which can correspond to indices, as described above.

A domain is received for at least a first column of the plurality of columns. The domain includes a plurality of values that represent valid values for the at least a first column (e.g., that may give rise to a violation of a constraint). A domain or single value for at least a second column of the plurality of columns is received. The domain or single value can be valid for the at least a second column. A sorted ordering of rows of the table is created, where the rows are ordered according to column values of respective rows. The sorted ordering can be an array of index values for the rows, or can be a table comprising the sorted rows. A data structure is created that represents unique rows of the sorted ordering. The data structure can be an array of table row indices, or can be a table of unique rows. The data structure is analyzed to determine if the constraints are violated. An indication is sent of whether the constraints are violated.

In a further aspect, a method is provided for removing wildcard indicators from a table, such as a table specifying negative constraints. A request is received to determine whether a set that includes two or more of a domain, a value, or a combination thereof, is valid or invalid with respect to a set of negative constraints. A table representing the set of negative constraints is received. The table includes a plurality of rows and a plurality of columns, which can be associated with row IDs and column IDs, which can correspond to indices, as described above.

A domain is received for at least a first column of the plurality of columns. The domain includes a plurality of values that represent valid values for the at least a first column (e.g., that may give rise to a violation of a constraint). A domain or single value for at least a second column of the plurality of columns is received. The domain or single value can be valid for the at least a second column.

It is determined that the table includes one or more wildcard indicators. For rows that comprise one or more wildcard indicators, column positions are determined that include one or more wildcard indicators. For the rows that include one or more wildcard indicators, the row is added to a data structure for rows that have wildcard indicators at the determined column positions, where the data structure omits columns at the determined positions. The data structure can be an array of row and/or column indices, or can be a table that includes the corresponding values from the table representing the set of negative constraints. The data structure is analyzed to determine if the represented constraints are violated. An indication is sent of whether the represented constraints are violated.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 1 presents an example table of conditions that can be used to define a set of constraints for an object, and a table illustrating example domains and values for features of object instances.

FIGS. 2A-2G present a series of tables illustrating the determination of the minimum index of a first valid tuple for the table, which can be a table of constraints.

FIGS. 3A-3H present a series of tables illustrating how analyzing all table columns when the minimum index of the first valid tuple changes can produce more accurate results.

FIGS. 5A and 5B illustrate how a negative constraint table with wildcards can be represented as one or more subtables that do not include wildcards.

FIGS. 6A-6C illustrate how a negative constraint table with wildcards can be decomposed into one or more subtables that do not include wildcards.

FIG. 7A-7B illustrate how a negative constraint table with wildcards can be decomposed into one or more subtables that do not include wildcards, and how the order in which the subtables are analyzed does not affect an analysis outcome.

FIG. 10 is a flowchart of an example method for removing duplicate rows from a table.

FIG. 11 is a flowchart of an example method for removing wildcard indicators from a table.

DETAILED DESCRIPTION

Example 1—Overview

Figure 4A:
FIGS. 4A-4C present a series of tables illustrating how a table that comprises duplicate rows can be sorted, and unique rows extracted from the sorted table.

In many scenarios, a variety of characteristics can be used to model or analyze an object. However, only certain combinations of characteristic values may be permitted. For example, in modelling a car, there may be a finite number of colors in which the car may be available. While in theory perhaps a car could be of any color, in a manufacturing scenario, a color value that is not one of the available color values represents an invalid specification for the car.

Similarly, characteristics of an object may be interrelated. Continuing the example of a car, if a car type of "standard transmission" is selected, that may narrow down other drive train choices to a subset, including a single value, of drive train components that were initially available when the type of transmission had not yet been selected. Similarly, if "clutch pedal" is selected as a component for the car, the only type of transmission that may be selected for the car might be "standard transmission."

Thus, characteristics may have a range, or domain, of values. However, only certain combinations of characteristic values, even when the values are within an initial domain, may be valid. For complex objects, such as cars, there may be a very large number of components used to produce the car, each of which may have a range or domain of values, and various interrelations with other components.

When a user is instantiating an object (e.g., designing a new car or placing an order for a new car), it can be important that the user's choice represent valid selections. Otherwise, problems can arise, such as an inability to assemble the car, or engineering failures that can result in loss of life, property, and potential liability.

Typical systems to analyze configuration values in view of constraints can suffer from a number of problems. For example, particularly when there are a large number of characteristics or constraints, the processing time can be comparatively long, which may be inconvenient or impractical for a user. In some cases, an analysis system may not be able to perform an analysis until values have been assigned to all of the characteristics. If a significant amount of time was spent selecting the constraint values, it can be frustrating for a user to then learn that their selections were invalid. Also, the user may not be provided with feedback as to the source of a constraint violation, which does not assist the user in remedying the problem.

Configuration analysis systems may also be subject to erroneous determinations, including false positive or false negative results in certain scenarios. Configuration analysis systems may be incapable of correctly processing certain kinds of constraints, constraint values, or specifications of constraints (e.g., constraints that include wildcard values, negative constraints, or duplicate constraint specifications). Thus, room for improvement exists in analyzing constraints, including constraints that can be specified in a tabular form.

The present disclosure provides innovative methods for analyzing constraint tables. A particular disclosed method is directed to determining whether the table contains a valid tuple, and, if so, the minimum index of the first valid tuple. The method can be executed more rapidly, and provide more accurate results, than prior methods of constraint analysis. The method provides faster or more accurate results as values are selected for a particular characteristic. That is, whether a particular collection of constraint values is valid may change as one of the constraints is tied to a particular value (or subset of values) as compared with its initial domain. The disclosed method can provide for real-time indication of whether a current selection of domains and values is valid, as well as restrict further value selections to valid values.

The present disclosure also provides for enhanced analysis of negative constraint tables by facilitating the identification and removal of duplicate tuples. A table can be sorted and unique tuple values identified or extracted. Wildcards can be identified, and used to form subtables that are free of wildcards. Duplicate-free tables, or representations thereof, can then be further analyzed, such as to determine entailment or violation, or to determine table tuples that may remain valid.

As will be further described, in some cases, rows of a table can be duplicative, particularly when only particular columns are selected from a larger table (e.g., the rows were unique in the full table, but no longer unique in the selection). In the case of negative constraints, the presence of duplicates can result in combinations of attributes being identified as not possible, which are in fact possible, which can reduce the number of options available. For example, in configuring a product or other object, or other scenarios, legitimate options may not be made available, or indicated as not allowed when they should be allowed under a proper analysis. Disclosed technologies can account for duplicate rows in a table, including as a result of wildcards, which can provide more accurate results.

Determining entailment/violation can be used, in some cases, to convert a disjunctive constraint that cannot be used for domain restriction into a constraint that can be used for domain restriction. This process may guide a user in selecting available options (or avoiding unavailable options), or may improve the speed or accuracy of determining remaining available options. For example, techniques that employ backtracking can be more efficient if they encounter fewer dead ends or impossible values that would result in a backtracking operation.

As an example, for a constraint x=1 OR y IN {1,2}, if it is known that x cannot be 1 (resulting in a violation of x=1), as a result of a violation/entailment check, the constraint can be rewritten as y NOT IN {1,2}. Thus, the violation/entailment check allows the domain of y to be restricted, which can provide more accurate selection options and improve subsequent analysis techniques.

Note that a particular condition can be expressed as a negative condition (e.g., y NOT IN {1,2}) and used in either a positive constraint or a negative constraint. Changing a condition between positive and negative definitions can change the corresponding constraint between positive and negative. In the above example, x=1 OR y IN {1,2} can mean that a violation occurs if this condition is true (negative constraint) or that entailment occurs if this condition is true (positive constraint). When the condition is rewritten as y NOT IN {1,2} based on determining that x cannot be 1, the positive or negative aspect of the constraint also changes. In the negative constraint, meeting the positive condition resulted in a violation, but failing to meet the rewritten negative condition results in entailment of the positive constraint. Similarly, while the condition being false for a positive constraint resulted in a violation, the rewritten condition results in entailment if the condition is true. So, determining entailment or violation of the original table (e.g., x cannot be 1) allows the domain of y to be restricted.

Although aspects of the present disclosure are described with respect to product configuration or the configuration of other types of objects (which could be real objects or virtual objects), disclosed technologies can be used in other contexts. For example, the technologies can be used in supply chain management applications, such as by analyzing allowed combinations and their associated costs. Additional applications of constraint analysis are disclosed in Wallace, M., "Practical Applications of Constraint Programming," *Constraints* 1:139-168 (1996), incorporated by reference herein. Constraint analysis may also be employed in routing scenarios, including network routing and vehicular routing, such as providing an indication of available and unavailable routes, as well as, optionally, associated costs.

Constraints and conditions may be provided or maintained in various formats, such as in database tables, spreadsheet programs, or "variant tables" (which need not be stored in a tabular data structure). Similarly, data analyzed for consistency with constraints can be provided in various forms, including with reference to database tables, spreadsheets, or other data sources. Typically, constraints are analyzed in data structures that include columns, or the equivalent of columns, having a type (e.g., a datatype, such as int, float, string, etc.), where each cell contains one or more literals of that type or a wildcard.

Example 2—Example Features, Conditions, and Constraints

FIG. 1 illustrates how an object can have characteristics, and the characteristics can be used to define constraints for the object. In particular, FIG. 1 illustrates a table 104 that includes a column of features 108 (e.g., characteristics and other features) and a column of conditions 112. One or more of the conditions 112 can be used to define the set of constraints for the object. When multiple conditions 112 are included, typically all of the conditions must be satisfied for the instance to be a valid instance of the object. However, as will be further explained, the combination of allowed or disallowed values can produce a set of constraints, where, in the case of positive constraints, the object is valid with the constraints so long as the selected (or values available to be selected) are consistent with one set of allowed values. Whereas, the object is not valid if no possible set of allowed values is consistent with the currently selected and remaining available values. In the case of negative constraints, the object may not be valid if the assigned values and available values might match a set of constraint values, and is valid if no set of values of the constraints can match the assigned values and remaining available values.

Conditions can be specified in a number of ways. Condition 114, for Characteristic A, is a conditional expression, which, in this case, evaluates a field, such as of a particular database record, with respect to another value, such as the value of a variable. However, any suitable conditional expression may be used.

Condition 116 expresses a restriction for a CAR object. The condition 116 references table 120. The particular characteristics of the CAR object, engine and battery, are selected from the same row of the table 120. That is, if the engine is a "4 Cylinder" engine, then a "12 V" battery is selected, and vice versa. If a "14 V" battery is selected, then a "6 Cylinder" engine is selected, and vice versa. The table 120 is for illustrative purposes only, and a table used for characteristic definition or selection can have any desired number of rows and column (fields).

Condition 130 expresses a set (in this case of integers) from which Characteristic C may be selected. Characteristic D is constrained by a negative condition 134, in this case expressing that a string value is not equal to "RED." In at least some cases, positive constraints can be written as negative constraints, and vice versa. Also, negative conditions can be used in either positive or negative constraint tables. Condition 138 for Characteristic E is expressed as a mathematical operation of two variables (but can include multiple operators, one or more variables, one or more constants, and combinations thereof).

Condition 142 for Characteristic F is specified by a SQL statement. Characteristic G is specified with respect to a condition 146 that is associated with another characteristic, in this case Characteristic C. Characteristic G is selected from a first set if values for Characteristic C are in a particular set, and from a second set otherwise. Characteristic H has a wildcard condition 150, meaning that any value is acceptable.

Table 160 lists instances 164 (164a, 164b) for CAR objects. Instance 164a specifies particular values 166 for Characteristics A, B, D, and the Battery characteristic. The values 166 can be used for multiple purposes. First, they can be used to determine whether the instance 164a is, so far, compliant with the set of constraints provided by table 104. In this case, all of the current values are within the domains of the features 108 as specified in table 104.

The values 166 currently assigned to instance 164a can also be used, at least in some cases, to determine what values can be assigned to features that have not yet been assigned a value. For example, value 166a, "14 V" assigned to the Battery characteristic can be evaluated with respect to condition 116. The condition 116, along with the table 120, indicates that the value 166b for Engine can have only one value, "6 Cylinder" and still be valid with the set of constraints of the table 104. In some cases, determining that only one or a limited number of values are available can be used to autocomplete or suggest values for characteristics that have not yet been assigned a value. Doing so can, for example, facilitate object configuration by a user, as well as reducing the possibility of selecting a non-compliant set of characteristic values.

Instance 164b includes a value 166c of RED for Characteristic D. When analyzed, by a disclosed method, the value 166c can result in an indication that the instance is invalid, as it violates condition 134. Instance 164b includes a value 166d for Characteristic C of 3. Thus, when Characteristic G is selected, condition 146 will indicate that is must be selected from {A1, B1, C1) to be valid.

Disclosed technologies can use constraints composed of conditions, such as in table 104, to determine whether a particular object instance, such as in table 160, is valid. A constraint can be expressed as a Boolean combination of conditions, or expressions. Constraints may use other types of logical operators, such as NOT, ELSE, IF, IN, etc. Disclosed technologies can be used to provide an indication of what values may remain available for selection given one or more constraints. For example, information regarding validity or remaining values can be provided to a user through a user interface. A program can use the indications to restrict value selection to values that remain possible valid selections.

Example 3—Example Determination of First Row of Valid Constraint Values

In some aspects, the present disclosure provides an improved method to a constraint table to find the first row where all column values are valid, at least under the currently selected values or available domains for the variables (columns) of the table. The method can be carried out by analyzing the constraints as a set of tuples of possible values for a set of characteristics that are within the domains of the characteristics.

For example, assume that three characteristics, x, y, and z, are to be evaluated, each of which can have a possible values of {0, 1, 2}, but where the conditions for each characteristic are such that the domains for validity of the conditions are {1, 2}. So, for the tuple (x, y, z), (1, 1, 1) would be a valid tuple (e.g., satisfies the conditions set on x, y, and z), while {0, 1, 1} would be an invalid tuple, as '0' is not valid in the domain for x.

As the domains of the characteristics change, the set (which can be a set of one, an empty set, or a set of multiple tuples) of valid tuples can change. For example, if a particular value is selected for a characteristic, tuples that have a different value for that characteristic will no longer be valid, even if they were possible, valid tuples in the original domain. As an example, (1, 1, 1) was a valid tuple under the original domains, but if the domain of x is changed to {2}, then the tuple becomes invalid.

The set of possible tuples can be expressed as a table, or matrix. A method of analyzing a constraint table can include:
  Set the putative minimum index of the first valid tuple to 0;
  Analyze variables whose domains were modified and try to increase the putative minimum index of the first valid tuple by skipping over values that are not within the current domain for the variable (characteristic);
    If the table has not previously been analyzed, treat all variables as having modified domains
  If the putative minimum index of the first valid tuple changes, analyze all other columns again;
  Repeat until no more columns can increase the minimum index of the first valid tuple;
  If a valid set of tuples was identified, set the minimum index of the first valid tuple as the putative minimum index of the first valid tuple or, if no valid set was identified, report that the table contains no valid tuples.

If a valid tuple is identified, then at least one valid tuple exists, at the minimum index, so long as the variable domains do not change. In the case of positive constraints, if no valid tuple is identified, the constraints are violated. In the case of negative constraints, if no valid tuple is identified, the constraints are entailed.

This method is first explained with reference to the example illustrated in FIGS. 2A-2G. In the initial state of FIG. 2A, each variable (or constraint) x, y, z has a domain of {1, 2}. The rows of table 202 list the possible tuples (which can be all or less than all of the possible permutations of all possible variable domain values, currently assigned variable values, or a combination thereof). Note that some of the tuples have values that are outside of the domain for a respective variable. The putative minimum index of the first valid tuple is set to zero. As the table 202 is evaluated for the first time, all variables are treated as having a changed domain.

According to the second step of the method, the first column is searched from top to bottom for a tuple that includes a valid value for x. In this case, row 5, with a value of 1 for x, is set as the putative minimum index of the first value tuple, as indicated in FIG. 2B. That is, no matter what the values of y and z in rows 1-4, the value of x in those rows is not within the specified domain, and so those tuples cannot be valid.

Having found a valid value of x, it is determined whether the value of y in row 5, being the putative minimum index of the first valid tuple, is analyzed to determine whether it is in the current domain of y. In this case, it is not, as y has a value of 0, which is not in the domain of {1, 2}, as indicated in FIG. 2C. So, the search for a valid tuple continues by searching down the y column (again, rows 1-4 cannot be valid, as they have been determined to have invalid values for x). A valid value of y is present in row 6, and so the putative minimum index of the first value tuple is set to 6, as indicated in FIG. 2D.

However, because the putative minimum index of the first valid tuple changed, the columns for the other variables need to be (re)evaluated, starting from the new putative minimum index value. Taking first variable x, as shown in FIG. 2E, the value for x in row 6 is valid. Analyzing y again (or, instead y could be ignored at this iteration, if desired), the value for y in row 6 is still valid. Finally, turning to the column for variable z, the value for z in row 6 is valid, as shown in FIG. 2F. Thus, the algorithm can stop, with the tuple at index (row) 6 representing the minimum index of the first valid tuple.

Note that the minimum index of the first valid tuple does not imply that there are no other valid tuples in the constraint table 202. For example, as shown in FIG. 2G, the table 202 can have additional rows, which are not (yet, at least) analyzed, and which may hold valid or invalid tuples. However, when analyzing positive constraints, the presence of a single value tuple implies that the current variable values or domains do not result in a violation, as at least one constraint expression can possibly be satisfied. The existence of additional solutions does not make the values or domains "more valid."

However, as explained below, assigning a value to a variable, or removing a value from its domain, can result in a constraint that was previously satisfied being violated, in which case other possible solutions, lower in the table 202, would be analyzed for validity. Note also that the absence of a current violation does not mean that the assigned variables and remaining domains are necessarily valid, or entailed, only that at least one valid possibility remains. Once all variables are assigned, it may still be determined that the final combination does not match a valid tuple of the table 202. Similarly, in the case of negative constraints, unless no valid tuple is found, entailment cannot be determined, only the possibility that a violation may exist.

To illustrate, assume that the domain of one (or more) of the variables changed. For example, assume that the domain of variable y went from {1, 2} to {2}. This change in domain could represent the value 2 being affirmatively selected as the value for y. The selection could be made in response to user input, as a result of applying a rule, or by the value being determined in another manner. In this case, it is known from the prior analysis that the minimum index of the first valid tuple cannot be higher than 6. Since there are no more rows in table 202, the minimum index of the first valid tuple slips out of the table, indicating that no valid tuples exist and the selection of 2 as the value of y violates the set of constraints. If, on the other hand, more rows were present, the process would continue as described above. If a valid value of y (2) was found in a lower row, the value of x, and possibly z, would be evaluated to determine if that row represented a valid tuple, with the putative minimum index increasing each time an invalid value was found.

FIGS. 3A-3H illustrate the utility of repeating the analysis for all columns when the putative minimum index of the first valid tuple changes. Taking table 302 in the initial state of FIG. 3A, and applying the algorithm above, the first valid tuple would initially be set to 0. Row 1 would be identified as having a valid value for x, as shown in FIG. 3B. However, with reference to FIG. 3C, row 1 does not have a valid value for y. Moving down the y column, row 2 is indicated as having a value of 1, which is valid, and results in the putative minimum index of the first valid tuple being increased to 2, as shown in FIG. 3D. However, with reference to FIG. 3E, row 2 does not represent a valid tuple, as the value for x in row 2 is not in the domain of x.

Erroneous results could also arise if the y column were examined before the x column, but all columns were not re-analyzed once the putative index of the first valid tuple changed. That is, the first valid value of y is in row 2.

Looking again at x, the value of x in column 2 is not valid. This results in searching down the x column, where the value in row 3 is valid for x, increasing the putative minimum index of the first valid tuple to 3, as shown in FIG. 3F. However, the value of y at row 3 is not valid, as shown in FIG. 3G. With reference to FIG. 3H, increasing the putative minimum index of the first valid tuple to 4 results in the index being out of bounds (e.g., exceeding the number of rows in the table 302), indicating that no valid tuple exists. Thus, when the putative minimum index of the first valid tuple is increased, if the other columns are not checked, erroneous results may be provided.

As explained above, identifying the minimum index of the first valid tuple is useful because it indicates that at least one tuple exists for which a valid combination of characteristic values is possible given the current domains of the characteristic values. Note that, at least it some cases, it will not be possible to determine whether the final, selected combination of values will satisfy a set of constraints. This is illustrated in the examples shown in FIGS. 2 and 3, where the setting of a value for a variable, thus removing other possible values for that variable, resulted in a violation.

However, in some cases, the algorithm can continue its analysis beyond finding the minimum index of the first valid tuple. This can be useful in that the algorithm may be able to determine whether any remaining variable selections (that do not change the domain of an already-assigned variable) can result in an invalid tuple. If no invalid tuples remain in the domains of the variables, then, in the case of positive constraints, the instance can be determined to be entailed. In the case of negative constraints, the instance can be determined to violate the constraints. Typically, such entailment or violation is only determined after all variables have been selected.

Even if entailment cannot be determined, the algorithm can track which tuples remain valid possibilities. The variable values from these tuples, or a portion thereof, can be presented to a user as possible characteristic values to produce a valid object instance. For example, an unassigned variable might purportedly be selected from a domain of {1, 2, 3, 4, 5}. However, the algorithm may analyze possible valid tuples and determine that other variable assignments are such that only {1, 4, 5} are valid selections. These options can be provided to a user, which can guide the user towards a valid object instance. Stated another way, the algorithm can be used to refine a variable domain to values that will result in entailment (which can be based on either negative or positive constraint tables, where values that result in entailment are added to, or left in, a set, and values that result in violation are removed from, or not added to, a set).

In some cases, it may not be practical to determine entailment until at least some variables have been assigned, with the number of variables needing to be assigned depending on the interrelation or complexity of the conditions. For example, some variables may be dependent on the value assigned to another variable. According to one implementation, suggestion of variable/domain restriction is carried out when a number of possible values, such as a number of unassigned variables, is less than a threshold. According to another implementation, suggestion of variables can be provided in sets, where interdependent variables are included in the set (e.g., when A is equal to {a}, B must be selected from {c,d,e} for the instance to be valid).

The minimum index value of the first valid tuple can be used for other purposes. For example, as explained above, in some situations, positive table constraints are only checked for violations, not entailment. However, when entailment is to be determined, including upon assignment of values to all variables, the entailment check can start from the minimum index value, saving computational time. Similarly, other arc consistency algorithms, such as simple tabular reduction (STR) and its variants, can begin execution from the minimum index value of the first valid tuple, again conserving computation resources. Arc consistency algorithms can be used to maintain a set of consistent tuples, given a variable domain. The set of consistent tuples can be maintained as a subset of possible tuples, or can be maintained by reordering, such as reordering in a table or another data structure (e.g., a data structure that contains row indices), such that valid (or at least potentially valid) tuples and known invalid tuples are separated into discrete portions of the tables (e.g., having invalid tuples at the topmost or bottommost rows of a table).

Example arc consistency algorithms that can be used in combination with the disclosed technologies include the algorithms disclosed in the following references, each of which is expressly incorporated by reference herein to the extent not inconsistent with the present disclosure: Ullman, J. R., "Partition search for non-binary constraint satisfaction," *Information Sciences* 177 3639-3678 (2007); Li, et al., "Making Simple Tabular Reduction Works on Negative Table Constraints," *Proceedings of the 27$^{th}$ AAAI Conference on Artificial Intelligence*, 1629-1630 (2103); Marriott, et al., "Note: Negative Boolean constraints," *Theoretical Computer Science* 160 365-380 (1996); Gulwani, et al., "Program Analysis as Constraint Solving," *Proceedings of the 29th ACM SIGPLAN Conference on Programming Language Design and Implementation, ACM SIGPLAN Notices—PLDI '08*, 43(6): 281-292 (June 2008); Lecoutre, C., "STR2: optimized simple tabular reduction for table constraints," *Constraints*, 16(4):341-371 (October 2011); and Lecoutre, et al., "Improving the lower bound of simple tabular reduction," *Constraints*, 20(1):100-108 (August 2014).

Example 4—Example Removal of Duplicate Tuples

One potential issue in analyzing negative constraints in tabular form is the presence of duplicate rows/tuples. In some cases, a table of constraints may contain duplicate tuples, such as when conditions are provided from multiple sources, some of which may have the same constraints. Or, in some cases, constraint analysis may be performed using a subset of a set of constraints, which may be, or be equivalent to, selecting particular columns of a larger constraint table.

In the example of a constraint table, selecting a subset of the table's columns can result in duplicate rows/tuples, even if there were no duplicates in the original table. That is, a column whose values may have made the rows unique in the parent table may not be selected for the subtable, thus the values used to discriminate between the rows in the parent table are not included in the subtable, resulting in the rows being duplicative.

Duplicate values can arise in other ways, such as when a negative constraint is specified with the use of a wildcard value. Wildcard removal will be discussed in Example 5.

A method is provided for pre-processing a constraint specification, such as in tabular form, to remove duplicate tuples. In a first step, an array, or index, is created for the table, where an index is assigned to each row of the table (or to a reference, such as a pointer, to the row of the table). The array is then sorted. For example, the rows may be sorted in ascending or descending order by tuple values. Unique tuples may then be extracted from the ordered set.

Figure 4B:

FIG. 4A illustrates an example unsorted table 410 and FIG. 4B illustrates an example sorted table 414 produced from the unsorted table 410. As indicated above, sorting can be carried out by comparing values of tuple elements (e.g., column values) between two rows until the values differ at a particular tuple element, or the tuples are determined to be equivalent. Any suitable sorting algorithm can be used. In at least some cases, a sorting algorithm can compare full tuples with one another (e.g., tuple elements are progressively compared until an ordering can be determined, such as which tuple is "greater" or "smaller", or if the tuples are equal).

As an example of how sorting can be accomplished, row 4, having the tuple of (2, 1, 0), can be determined to be "greater" than tuples having values of (0, *, *) or (1, *, *) based on comparison of the first tuple elements. Row 4 is equal to row 9.

If first tuple elements of tuples being compared are the same, an attempt can be made to sort the tuples relative to one another based on the second element. For example, rows 1 and 6, each with a tuple of (1, 1, 2) can be determined to be "greater" than the tuple (1, 0, 1) of row 7, as the second element of rows 1 and 6 ('1') is greater than the second element of row 6 ('0'). This process can continue as needed using additional tuple elements. Row 2 can be determined to be in between row 7 and rows 1 and 6 in the sorted table 414. Although row 2 and rows 1 and 6 have identical first and second elements, the third element ('2') in rows 1 and 6 is greater than the third element ('1') of row 2.

Note that, at least in some cases, the sorted table 414 is not materialized. That is, table 414 is provided to conceptually illustrate the results of sorting, but may not be the actual product of sorting. As explained above, the result of the sorting can be an array (or other data structure) whose indexes are sorted based on tuple comparison, but the actual rows are not exchanged or reordered in the unsorted table 410. For example, FIG. 4A illustrates an initial array 420 of row indices and FIG. 4B illustrates a sorted array 424 of row indices that corresponds to the sorted table 414. However, in other implementations, a sorted table 414 can be materialized. In such cases, the array of indexes 420, or producing a sorted array 424, may not be needed.

Also note that, at this point, the sorted indexes 424, or table 414, can have duplicates. However, duplicate tuples will either have adjacent indexes or be located in adjacent rows.

Figure 4C:

An array, or other data structure, is then created that represents unique tuples in the sorted table 414 or sorted indices 424. Or, unique tuples can be added to a separate table. Starting with the first index value (or row) of the sorted table 414 (or the sorted array 424), adjacent tuples are compared. If the tuple on the right side of the comparison differs from the tuple on the left side of the comparison, the index of the tuple of the left side of the comparison is added to an array of unique tuples (or its tuple/row is added to the table of unique tuples). If the tuples are equal, the comparison increments to the next index (or row). Because the indices of the array of tuples 424 (or the table 414) is sorted, it can be ensured that when two adjacent tuples are not equal, a new unique tuple has been identified. The final results of this comparison are shown in FIG. 4C, which illustrates a table 430 of unique tuples and a corresponding array 434 of table indices representing unique tuples.

Once the array of indexes of unique tuples 434 has been created (or the table of unique tuples 420 populated), a suitable constraint analysis method can be used to determine whether or not a current set of variable values is valid, or entailed (e.g., no tuples match the current variable domains). In at least some cases, violation cannot be determined until a larger number, or in some cases, all variables have been assigned a value. That is, for example, if a domain is {1, 2, 3, 4), and a negative constraint specifies that 3 is not allowed, it cannot currently be determined that the instance is entailed, because {1, 2, 4} is valid under the constraint. However, if the variable is assigned a value of "2," then a condition that specifies "3" cannot be valid, and the instance is entailed as to that condition. If other conditions of a constraint are similarly entailed, then the instance can be determined to be entailed. That is, when there are no valid tuples for a particular domain, the instance is entailed. If a valid tuple exists for the current variable domains (e.g., at least one variable has not been assigned a value), a violation may exist.

Various methods of analyzing negative constraints can be used. In one aspect, the negative variant of simple tabular reduction is used. In another aspect, a method analogous to the method described in Example 3 is used to determine entailment with respect to a negative constraint table. Violation detection, and variable selection, can be assisted in a corresponding manner to entailment determination for positive constraints or conditions.

Example 5—Example Wildcard Removal

As discussed above in Example 4, duplicate tuples can arise in some cases because tuples are exact duplicates of one another. In other cases, duplicates can arise when wildcards (or similar operators that can specify multiple, alternative values) are present. For example, if '*' represents a wildcard, the tuple (1, *) may be satisfied by (1, 1). However, the tuple (*, 1) can also be satisfied by (1, 1). Thus, the tuple (1, 1) can be described by two distinct tuples/rows in a constraint table.

According to an aspect of the present disclosure, a method is provided for analyzing negative constraints that include wildcards. Briefly, wildcards are located and used to decompose the table into a set of tables without wildcards. The set of tables without wildcards can then be further processed, including searching for and removing other duplicate values (e.g., verbatim duplicates) as described above.

The method first identifies the various combinations of wildcard positions within the tuples of a table. For example, in the tuple (1, 1, *), the wildcard is in the column 3 position only, ({3}). In the tuple (*, 1, *), the wildcards are in positions 1 and 3 ({1, 3}). A subtable is then created by taking rows having wildcards in the specified positions, and omitting the columns that include only wildcards.

FIGS. 5A and 5B illustrate how decomposing a table in this manner does not affect the outcome of analyzing the constraints. Taking the simple table 510 of FIG. 5A, the row of the table can be read to state that "a violation occurs if x has the value of 0, z has the value of a, and y has any value." That is, the value y is irrelevant to the outcome. Following the above procedures (forming a new table from rows having wildcards in particular positions and then removing columns consisting of wildcards) provides table 514 of FIG. 5B. Table 514 also can be read as saying a violation occurs if x has a value of 0 and z has the value of a, regardless of any other values or variables that may be present.

FIGS. 6A-6C provide another example of table decomposition to remove wildcards. In FIG. 6A, in table 610, it can be seen that four wildcard combinations exist, wildcards at positions {1, 3} (rows 3 and 4), {2} (row 5), {3} (row 1), and {empty} (rows 2 and 6). FIG. 6B illustrates the results of taking each of these options to form subtables 620, 622, 624, 626. Removing the columns of wildcards (if any), gives rise to, with reference to FIG. 6C, tables 630, 632, 634, 636, corresponding respectively to the four wildcard combinations identified above.

FIGS. 7A and 7B provide a further example of decomposing a table with one or more wildcards into one or more subtables without wildcards. FIG. 7A illustrates an original table 710 containing wildcards. Following the process described above provides subtables 720, 722, 724, illustrated in FIG. 7B.

Note that the order in which the subtables 720, 722, 724 are produced, or the order in which they are processed, including for an entailment or violation check (e.g., using the algorithm of Example 3) or for determination of tuples that remain valid possibilities (e.g., using a variant of the STR algorithm for negative constraints) does not affect the final results.

That is, with continued reference to FIG. 7B, it can be determined that the only valid tuple is $\{1,1,1\}$. This tuple is obtained by analyzing the subtables of FIG. 7B in the order of table 720, table 722, table 724. Analyzing table 720 first indicates that x cannot have a value of '0'. Given the domain of x, the only remaining possible valid value of x is '1'. Turning next to table 724, if x is '1', z cannot be '0'. Thus, given the domain of z, the only possibly valid value of z is '1'. Finally, with reference to table 724, if z is '1', y cannot be '0'. So, the only possible valid value of y is '1', giving a final, valid tuple of $\{1,1,1\}$.

In at least some cases, a constraint-analysis method analyzes all possible ordering permutations of the subtables produced using the disclosed method for removing wildcards. Thus, no matter where the algorithm starts, it will reach the same conclusion as to whether a particular set of domains is valid. In the example of FIG. 7B, all orders other than 720, 722, 724 result in no valid tuple being identified.

For example, if the order was carried out as 722, 724, 720, first, subtable 722 would indicate $\{1,?,1\}$ and $\{0,?,0\}$ as possible valid tuples, providing a domain of $\{0,1\}$ for both x and z. Turning next to subtable 724, since y cannot be '0' if z is '1', the possible tuples are $\{1,1,1\}$ and $\{0,0,0\}$, providing domains of $\{0,1\}$ for x, y, and z. However, using these domains violates subtable 720, as a value of '0' is not valid for x under the constraint of that subtable. Stated more generally, but still with reference to FIG. 7B, if 's' is the sequence of constraints applied to reach a particular point where the domains or values of the variables (x, y, z) are fixed, then s=n, 720, m, 722, k, 724, l, where n, m, k, l are potentially empty sequences of constraints.

It should also be appreciated that a row that consists entirely of wildcards can immediately be used to determine that a valid tuple does not exist. This is because, for all of the variables, any value results in violation of the constraint. Similarly, if a single column of a negative constraint table consists entirely of wildcards, it can be determined that no valid tuple exists where the variable corresponding to the column must be assigned a value. If the variable is optional, then a violation may not exist so long as the variable is not assigned. In any event, the domain of the variable can be set to NULL.

While the process of FIGS. 6 and 7 removes wildcards, it can result in tables that contain tuples that are verbatim duplicates. This can be addressed by processing the subtables formed from the process of FIGS. 6 and 7 using the process described with respect to Example 4 for removal of verbatim duplicates.

The disclosed methods for duplicate tuple removal, both for wildcards and for verbatim duplicates, at least in some cases, can be performed once for a particular set of constraints and domain values. That is, it is assumed that tuples will only be removed as no longer being potentially valid (e.g., resulting in a violation), and not added. A Boolean variable or flag can be set to indicate whether the duplicate check has previously been performed. If desired, different Boolean variables can be used to distinguish between wildcard-duplicate checking and verbatim entry-duplicate checking.

In further aspects, duplicate checking (either wildcard or verbatim based) can be performed if at least one valid tuple exists in a negative constraint table. For example, the entailment check of Example 3 may be performed, with further preprocessing being conducted if at least one valid tuple exists (indicating the possibility of a violation).

If desired, various method steps can be omitted or shortened based on annotations, such as annotations provided by a user. For instance, a user can provide an indication, which can be used to set a Boolean variable or flag, that a constraint table is already sorted, in which case the process described with respect to FIG. 4 can be omitted. Or, a table can be indicated as not including duplicates, or particular types of duplicates (e.g., not containing wildcards or not containing verbatim duplicates), in which case one or both of the processes described with respect to FIGS. 4 and 6 (Examples 4 and 5) can be omitted.

Example 6—Example Computing Environment

Figure 8:
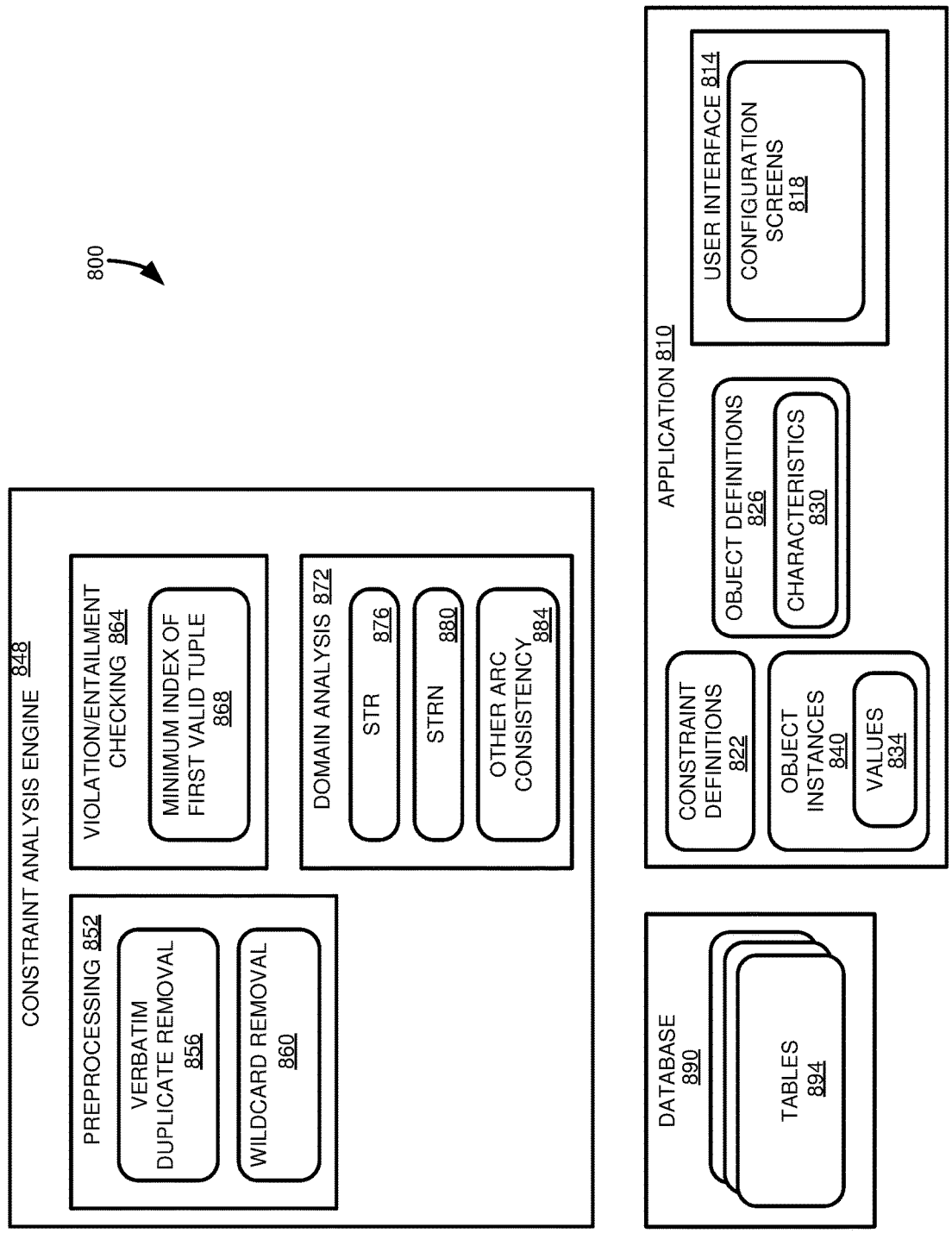
FIG. 8 is a block diagram of an example computing environment in which disclosed technologies can be implemented.

FIG. 8 illustrates an example computing environment 800 in which disclosed technologies can be implemented. The computing environment 800 can include an application 810. The application 810 can be an application that allows a user to configure an instance of an object that is subject to a plurality of conditions that define one or more constraints for the object instance. For example, the application 810 can provide for product configuration.

The application 810 can include a user interface component 814. The user interface component 814 can provide one or more configuration screens 818. The configuration screens 818, in various implementations, can provide a user with options to select characteristics for an object instance, provide guidance as to acceptable values for characteristics, and provide feedback as to whether currently selected values are valid. The configuration screens 818 can provide other functionality, if desired, such as to view or edit constraint definitions 822 or object definitions 826, including characteristics 830 associated with a particular type of object.

As an object is instantiated, values 834, or value domains, for characteristics 830 of the corresponding object instance 840 can be stored or maintained. Values 834 can be values assigned by a user or another software program, can include default values, can include suggested values based on constraint analysis, domains for characteristics not yet having an assigned value, or combinations thereof. The object instances 840 can be accessed (e.g., read/write access) through the user interface 814. Although not shown, in some embodiments, aspects of the application 810 can be used without the use of the user interface 814. For example, the application 810 may provide API's that can be accessed by other programs.

The application 810 can call functionality of a constraint analysis engine 848. The constraint analysis engine 848 can include a preprocessing component 852. The preprocessing component 852 can process constraint definitions 822 and values 834 of an object instance 840. The preprocessing component 852 can include various stored methods, such as a method 856 for removing verbatim duplicates from a negative constraint table and a method 860 for removing wildcards from a negative constraint table. The methods 856, 860 can be the methods described in Examples 3-5.

In another example, the preprocessing component 852 can determine whether a set of constraints, as reflected in tabular form, contains sufficient data for further analysis. In one aspect, the preprocessing component 852 can analyze a negative constraint table to determine if it contains enough rows to provide a sufficient number of counterexamples for the variables and their current values or domains. If not, the preprocessing component 852 can return an indication that the data is not in the correct format or otherwise valid, or can provide an indication that the set of variables does not produce a violation (e.g., there are not enough rows specifying negative constraints to result in all possible variable values resulting in a violation).

That is, for a particular set of domains and assigned values, all permutations of the assigned values with the remaining domains can be analyzed to determine how many counter examples are needed to reduce the domain of a variable. As an example, if a table contains a single row (0, 1) for [x:{0,1}, Y(0,1)] the domains of x and y cannot be reduced (e.g., only row exists, and the number of permutations is two if a particular value of x or y is assigned). On the other hand, for the table:

| x | y |
|---|---|
| 0 | 1 |
| 1 | 1 |

The number of tuples is equal to the number of permutations if a value is assigned to x or y (e.g., two, in this case, since if x=a, where a is either 0 or 1, the possible tuples are {a,0} and {a,1}). In this case, the domain of y can be restricted to {0}, as a value of '1' for y will always result in a violation.

However, this counting of rows/tuples can be invalid if duplicate rows exist. That is, say 4 tuples are required to possibly restrict the domain of a variable, and a table has 4 rows, but two are duplicates. A naïve analysis would indicate that domain reduction is possible. Analyzing the table for duplicates reveals that only three rows are unique, and thus the domain cannot be reduced. Preprocessing can determine which variables might possibly be restricted by further analysis, such as a STRN, which can guide further analysis (e.g., variables with an insufficient number of rows for domain reduction can be ignored). Further processing can be aborted, such as not performing STRN, in the event there is no variable whose domain might be restricted.

The constraint analysis engine 848 can include a violation/entailment checking component 864 for positive/negative constraints, respectively. The violation/entailment checking component 864 can include a method 868 for determining the minimum index of the first value tuple (or if one exists), such as described in Example 3.

In some cases, the constraint analysis engine 848 can include a domain analysis component 872. The domain analysis component 872 can include one or more methods to analyze a set of constraints, such as to determine what values or domains may remain valid for one or more object characteristics. The methods of the domain analysis component 872 can include the STR algorithm 876, or a variant thereof, a variant of the STR algorithm for analyzing negative constraints 880, or other arc consistency algorithms 884.

The computing environment 800 can include a database 890 that includes one or more database tables 894. The database tables 894 can store information of the application 810, such as the constraint definitions 822, the object instances 840 and their values 834, object definitions 826 and their characteristics 830, or combinations thereof. The database tables 894 can store values or domains that can be suggested to a user via the user interface 814.

The computing environment 800 is by way of example only, and the disclosed technologies are not limited to any particular computing environment. Further, functionality of the components of FIG. 8 may be split or combined without departing from the scope of the present disclosure. For example, the constraint analysis engine 848 can be incorporated into the application 810, if desired. In some cases, the database 890 can be omitted.

Example 7—Example Method for Determining Minimum Index of First Valid Tuple

Figure 9:
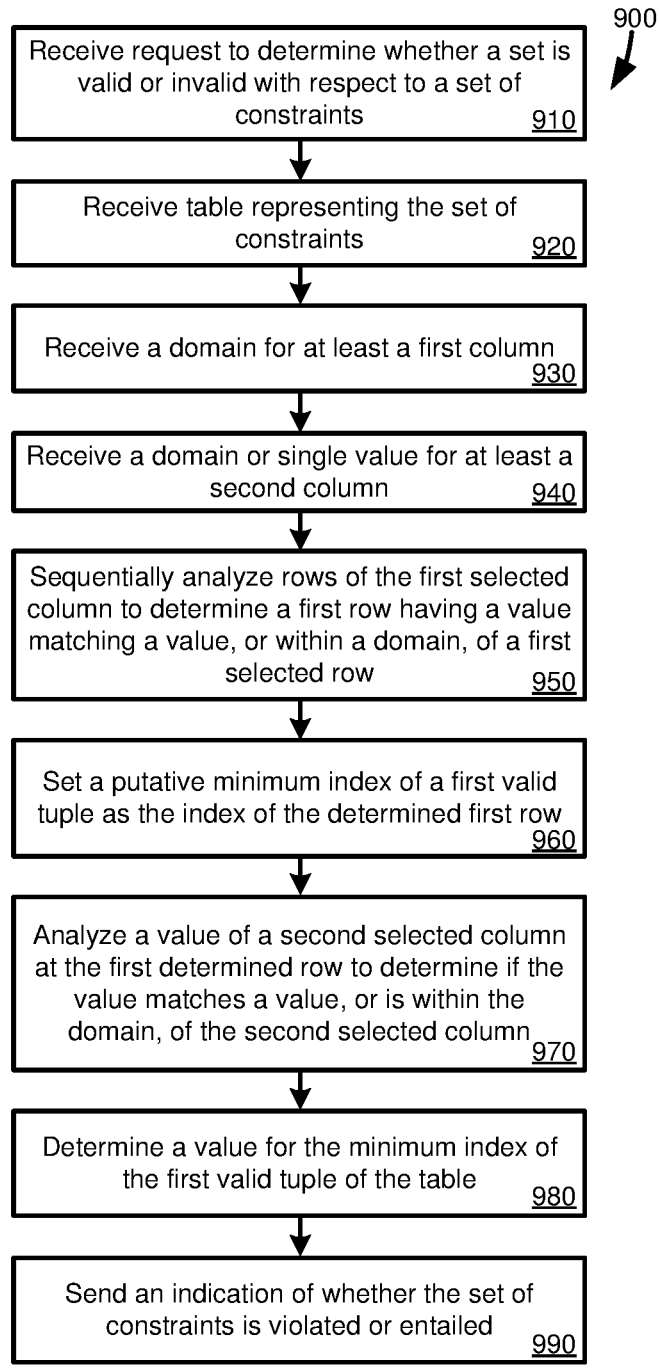
FIG. 9 is a flowchart of an example method for determining a minimum index of a first valid tuple of a constraint table.

FIG. 9 is a flowchart of an example method 900 for determining the minimum index of a first valid tuple of a table representing a set of constraints. The method 900 can be carried out using the computing environment 800 of FIG. 8. At 910, a request is received to determine whether a set that includes two or more of a domain, a value, or a combination thereof, is valid or invalid with respect to a set of constraints. The values or domains can represent values or domains for characteristics associated with an instance of a particular object type, and can include values provided through user input, or in response to an API call.

A table is received at 920 that represents the set of constraints. The table includes a plurality of rows and a plurality of columns, respectively associated with rows IDs and column IDs. The rows and columns may also have indices, which can be the same or different than the row IDs and column IDs. The indices can represent the position of the row or column in the table (e.g., the first row, second row, etc., or the first column, second column, etc., where rows are typically given indices from top to bottom and columns are given indices left to right).

At 930, a domain is received for at least a first column of the plurality of columns (e.g., at least one column, which can be any of the columns, not necessarily the "leftmost" column). The domain includes a plurality of values that represents valid values for the at least a first column. In the case of positive constraints, a valid value can be a value that does not result in a violation of the constraint. In the case of negative constraints, a valid value can be a value that results in a violation of the constraint. A domain or single value is received at 940 for at least a second column of the plurality of columns, where the domain or single value represents one or more valid values for the at least a second column. The domains/single values can be received, for example, from user input, or via an API call.

The rows of a first selected column, which can be the first column, the second column, or another column, are sequentially analyzed at 950 to determine a first row of the plurality of rows having a value matching a value, or being within the domain, of the first selected column. At 960, a putative minimum index of a first valid tuple for the table is set as the index of the determined first row. A value of the second selected column at the first determined row is analyzed at 970 to determine if the value matches a value, or is within a domain, of the second selected column.

At 980, a value of the minimum index of the first valid tuple is determined as the index of a row of the plurality of rows where column values for the row match a value, or are within a domain, of the respective columns, or determining that the table does not comprise a valid tuple. An indication is sent at 990 as to whether the set of constraints is violated (including in the case of positive constraints) or entailed (including in the case of negative constraints). The indication can be of affirmative violation or entailment, or a current indication of no violation or no entailment.

Example 8—Example Method for Removing Table Duplicates

FIG. 10 is a flowchart of an example method 1000 for removing duplicate rows from a table, such as a negative constraint table that is to be analyzed in view of current values or domains, such as values or domains of features, where columns of the constraint table correspond to features. The method 1000 can be carried out using the computing environment 800 of FIG. 8. At 1010, a request is received to determine whether a set that includes two or more of a domain, a value, or a combination thereof, are valid or invalid with respect to a set of negative constraints. A table representing the set of negative constraints is received at 1020. The table includes a plurality of rows and a plurality of columns, which can be associated with row IDs and column IDs, which can correspond to indices, as described above in Example 7.

At 1030, a domain is received for at least a first column of the plurality of columns. The domain includes a plurality of values that represents valid values for the columns (e.g., that may give rise to a violation of a constraint). A domain or single value for at least a second column of the plurality of columns is received at 1040. The domain or single value can be valid for the at least a second column. At 1050, a sorted ordering of rows of the table is created, where the rows are ordered according to column values of respective rows. The sorted ordering can be an array of index values for the rows, or can be a table comprising the sorted rows. A data structure is created at 1060 that represents unique rows of the sorted ordering. The data structure can be an array of table row indices, or can be a table of unique rows. At 1070, the data structure is analyzed to determine if the constraints are violated. An indication is sent at 1080 of whether the constraints are violated.

Example 9—Example Wildcard Removal

FIG. 11 is a flowchart of an example method 1100 for removing wildcard indicators from a table, such as a table specifying negative constraints. The method 1100 can be carried out using the computing environment 800 of Example 8. At 1110, a request is received to determine whether a set that includes two or more of a domain, a value, or a combination thereof, are valid or invalid with respect to a set of negative constraints. A table representing the set of negative constraints is received at 1120. The table includes a plurality of rows and a plurality of columns, which can be associated with row IDs and column IDs, which can correspond to indices, as described above in Example 7.

At 1130, a domain is received for at least a first column of the plurality of columns. The domain includes a plurality of values that represents valid values for the columns (e.g., that may give rise to a violation of a constraint). A domain or single value for at least a second column of the plurality of columns is received at 1140. The domain or single value can be valid for the at least a second column.

At 1150, it is determined that the table includes one or more wildcard indicators. For rows that comprise one or more wildcard indicators, at 1160, column positions are determined that include the one or more wildcard indicators. At 1170, for the rows that include one or more wildcard indicators, the row is added to a data structure for rows that have wildcard indicators at the determined column positions, where the data structure omits columns at the determined position. The data structure can be an array of row and/or column indices, or can be a table that includes the corresponding values from the table representing the set of negative constraints. The data structure is analyzed at 1180 to determine if the represented constraints are violated. At 1190, an indication is sent of whether the represented constraints are violated.

Example 10—Example Technical Solution

The disclosed technologies can provide a number of technical advantages, including saving computing time, processing power, and memory requirements in determining whether an object instance is valid, or determining remaining available values that can result in a valid instance. The disclosed technologies can also provide more accurate results, particularly when negative constraint tables are to be analyzed.

In the case of identifying whether a valid tuple exists, the check for a valid tuple can take O(1) space, rather than O(number of columns), as with other analysis methods. In the case of checking to see whether a particular set of values is valid (e.g., entailment for positive constraints for violation for negative constraints), the complexity is O (number of rows times number of columns) at worst. In practice, it can be significantly faster as the analysis can start from the minimum index of the first valid tuple, potentially skipping a number of rows.

In the case of verbatim duplication detection and removal, the complexity of the sort is typically O(number of rows*log (number of rows)) tuple comparisons. That is typically at most O(number of columns*number of rows*log (number of rows)). In practice, the worst case complexity would only occur if all tuples were equal. Typically, the sort is more likely to be O(number of rows*log (number of rows)).

For wildcard removal, each row of a table is copied to one subtable, while a column can be copied to multiple subtables. The method of decomposing a table into subtables typically makes O(number of rows) copies, including O(number of rows*number of columns) element copies and O(number of rows*number of column) index copies. So, the decomposition method takes O (number of rows*number of columns) additional space, and performs O(number of rows*number of columns) memory operations.

Example 11—Computing Systems

Figure 12:
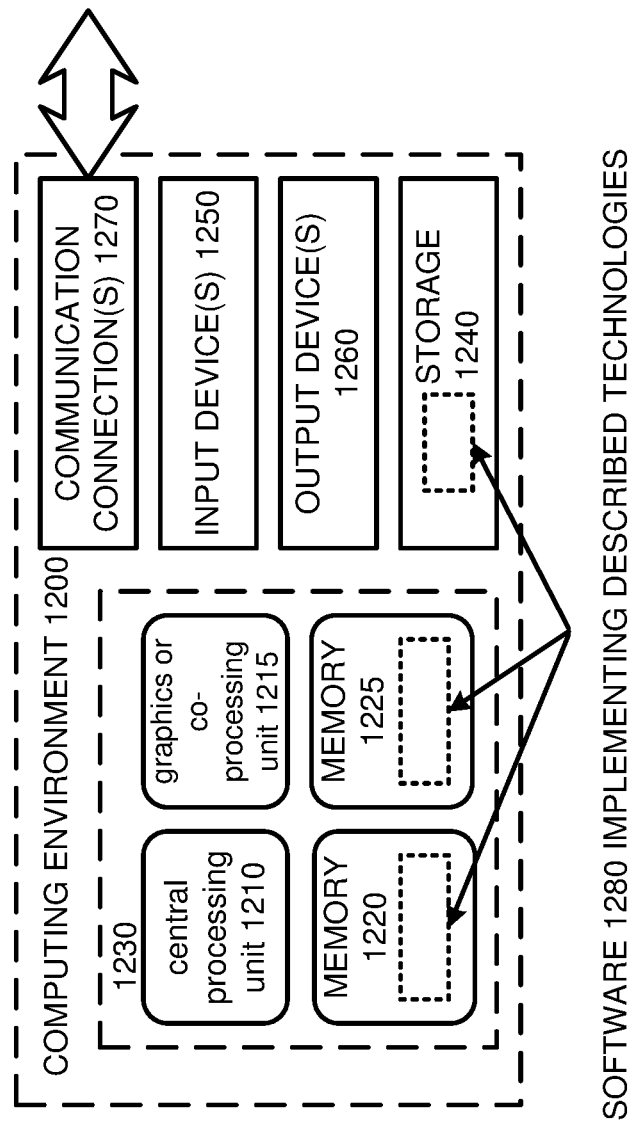
FIG. 12 is a diagram of an example computing system in which some described embodiments can be implemented.

FIG. 12 depicts a generalized example of a suitable computing system 1200 in which the described innovations may be implemented. The computing system 1200 is not intended to suggest any limitation as to scope of use or functionality of the present disclosure, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s) 1210, 1215. The memory 1220, 1225 stores software 1280 implementing one or more innovations described herein, in the form of computer-executable instructions suitable for execution by the processing unit(s) 1210, 1215.

A computing system 1200 may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 12—Cloud Computing Environment

Figure 13:
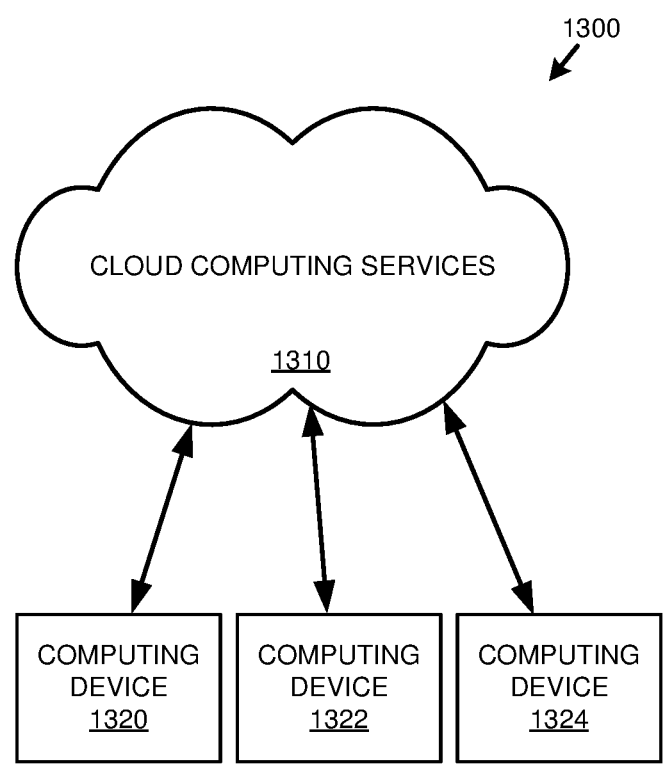
FIG. 13 is an example cloud computing environment that can be used in conjunction with the technologies described herein.

FIG. 13 depicts an example cloud computing environment 1300 in which the described technologies can be implemented. The cloud computing environment 1300 comprises cloud computing services 1310. The cloud computing services 1310 can comprise various types of cloud computing resources, such as computer servers, data storage repositories, networking resources, etc. The cloud computing services 1310 can be centrally located (e.g., provided by a data center of a business or organization) or distributed (e.g., provided by various computing resources located at different locations, such as different data centers and/or located in different cities or countries).

The cloud computing services 1310 are utilized by various types of computing devices (e.g., client computing devices), such as computing devices 1320, 1322, and 1324. For example, the computing devices (e.g., 1320, 1322, and 1324) can be computers (e.g., desktop or laptop computers), mobile devices (e.g., tablet computers or smart phones), or other types of computing devices. For example, the computing devices (e.g., 1320, 1322, and 1324) can utilize the cloud computing services 1310 to perform computing operators (e.g., data processing, data storage, and the like).

Example 13—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 12, computer-readable storage media include memory 1220 and 1225, and storage 1240. The term computer-readable storage media does not include signals and carrier waves. In addition, the term computer-readable storage media does not include communication connections (e.g., 1270).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more non-transitory computer-readable storage media storing computer-executable instructions for causing a computing system to perform processing comprising:
    receiving a request to determine whether a set comprising two or more of a domain, a value, or a combination thereof are valid or invalid with respect to a set of constraints;
    receiving a table representing the set of constraints, the table comprising a plurality of rows, each row having a row ID, and a plurality of columns, each column having a column ID;
    receiving a domain for at least a first column of the plurality of columns, the domain comprising a plurality of values that represent valid values for the at least a first column;
    receiving a domain or a single value for at least a second column of the plurality of columns, the domain or single value representing one or more valid values for the at least a second column;
    sequentially analyzing the rows of a first selected column of the plurality of columns to determine a first row of the plurality of rows having a value matching a value, or being within a domain, of the first selected column;
    setting a putative minimum index of a first valid tuple for the table as an index of the determined first row;
    analyzing a value of a second selected column at the determined first row to determine if the value matches a value, or is within a domain, of the second selected column;
    determining that the value of the second selected column at the determined first row does not match a value, or is within a domain, of the second selected column;
    sequentially analyzing the rows of the second selected column to determine a second row of the plurality of rows having a value matching a value or being within a domain of the second selected column;
    setting the putative minimum index of the first valid tuple for the table as an index of the determined second row;
    determining a value for the minimum index of the first valid tuple of the table as an index of a third row of the plurality of rows, where the third row is the second row or a row of the table other than the first row and the second row, where column values for the plurality of columns for the third row match a value, or are within a domain, of the respective columns, or determining that the table does not comprise a valid tuple; and
    sending an indication of whether the set of constraints is violated or entailed.

2. The one or more non-transitory computer-readable storage media of claim 1, wherein the set of constraints is violated, and the processing further comprises:
    providing visual indication to a user that a current set of values is invalid.

3. The one or more non-transitory computer-readable storage media of claim 1, the processing further comprising:
receiving user input providing at least one value for at least one column of the plurality of columns.

4. The one or more non-transitory computer-readable storage media of claim 1, the processing further comprising:
receiving a request from a user to instantiate a data object, the data object comprising a plurality of features, at least a portion of the plurality of features being subject to one or more constraints of the set of constraints; and
receiving user input selecting one or more values for one or more of the features.

5. The one or more non-transitory computer-readable storage media of claim 1, the processing further comprising:
determining one or more tuples that are no longer valid; and
removing one or more rows corresponding to the one or more tuples from the table.

6. The one or more non-transitory computer-readable storage media of claim 1, the processing further comprising:
determining that the domain associated with at least one column of the plurality of columns has changed or the at least one column has been assigned a single value; and
starting at the minimum index of the first valid tuple, carrying out at least the sequentially analyzing, analyzing, and determining for at least the at least one column.

7. The one or more non-transitory computer-readable storage media of claim 1, the processing further comprising:
for remaining columns of the plurality of columns, at the row corresponding to the putative minimum index of the first value tuple, determining if respective column values match respective single column values, or are within a domain, for respective remaining columns.

8. The one or more non-transitory computer-readable storage media of claim 1, the processing further comprising:
receiving user input modifying at least one column domain or selecting a value for at the least one column; and
determining if a value of the determined minimum index of the first valid tuple matches the selected value, or is within the modified domain.

9. The one or more non-transitory computer-readable storage media of claim 1, the processing further comprising:
determining that the table comprises one or more wildcard indicators;
for rows that comprise one or more wildcard indicators, determining column positions that include a wildcard indicator; and
for the rows that comprise one or more wildcard indicators, adding the row to a data structure for rows having wildcard indicators at the determined column positions, wherein the data structure omits columns at the determined positions.

10. The one or more non-transitory computer-readable storage media of claim 1, the processing further comprising:
creating a sorted ordering of the rows of the table, the rows being ordered according to column values of respective rows; and
creating a data structure representing unique rows of the sorted ordering.

11. The one or more non-transitory computer-readable storage media of claim 10, wherein creating a data structure representing unique rows of the sorted ordering comprises comparing adjacent rows of the sorted ordering and adding a compared row to the data structure if it has at least one tuple value that is different than a reference row.

12. A computing system that implements a method for constraint analysis, the computing system comprising:
one or more memories;
one or more processing units coupled to the one or more memories; and
one or more computer readable storage media storing instructions that, when loaded into the memories, cause the one or more processing units to perform operations for:
receiving a request to determine whether a set comprising two or more of a domain, a value, or a combination thereof are valid or invalid with respect to a set of negative constraints;
receiving a table representing the set of negative constraints, the table comprising a plurality of rows, each row having a row ID, and a plurality of columns, each column having a column ID;
receiving a domain for at least a first column of the plurality of columns, the domain comprising a plurality of values that represent valid values for the column;
receiving a domain or a single value for at least a second column of the plurality of columns, the domain or single value being valid for the at least a second column;
creating a sorted ordering of the rows of the table, the rows being ordered according to column values of respective rows;
creating a data structure representing unique rows of the sorted ordering;
analyzing the data structure to determine if the constraints are violated, the analyzing comprising:
sequentially analyzing the rows of a first selected column of the plurality of columns to determine a first row of the plurality of rows having a value matching a value, or being within a domain, of the first selected column;
setting a putative minimum index of a first valid tuple for the table as an index of the determined first row;
analyzing a value of a second selected column at the determined first row to determine if the value matches a value, or is within a domain, of the second selected column;
determining that the value of the second selected column at the determined first row does not match a value, or is within a domain, of the second selected column;
sequentially analyzing the rows of the second selected column to determine a second row of the plurality of rows having a value matching a value or being within a domain of the second selected column;
setting the putative minimum index of the first valid tuple for the table as an index of the determined second row;
determining a value for the minimum index of the first valid tuple of the table as an index of a third row of the plurality of rows, where the third row is the second row or a row of the table other than the first row and the second row, where column values for the plurality of columns for the third row match a value, or are within a domain, of the respective columns, or determining that the table does not comprise a valid tuple; and
sending an indication of whether the constraints are violated.

13. The computing system of claim 12, wherein creating a data structure representing unique rows of the sorted ordering comprises comparing adjacent rows of the sorted ordering and adding a compared row to the data structure if it has at least one tuple value that is different than a reference row.

14. The computing system of claim 12, the operations further comprising:
receiving a domain or single value for any remaining columns of the plurality of columns;
determining whether the domains and single values of the plurality of columns are associated with at least one tuple indicated in the data structure; and
sending an indication of whether the set of constraints is entailed based on the determining.

15. The computing system of claim 12, the operations further comprising:
determining that no valid tuple is indicated in the data structure; and
sending an indication that the set of constraints is entailed.

16. The computing system of claim 12, the operations further comprising:
determining at least one domain value that can be removed from a domain of a column of the plurality of columns.

17. In a computing system comprising a memory and one or more processors, a method of determining set of negative constraints is violated, the method comprising:
receiving a request to determine whether a set comprising two or more of a domain, a value, or a combination thereof are valid or invalid with respect to a set of negative constraints;
receiving a table representing the set of negative constraints, the table comprising a plurality of rows, each row having a row ID, and a plurality of columns, each column having a column ID;
receiving a domain for at least a first column of the plurality of columns, the domain comprising a plurality of values that represent valid values for the at least a first column;
receiving a domain or a single value for at least a second column of the plurality of columns, the domain or single value being valid for the at least a second column;
determining that the table comprises one or more wildcard indicators;
for rows that comprise one or more wildcard indicators, determining column positions that include a wildcard indicator;
for the rows that comprise one or more wildcard indicators, adding the row to a data structure for rows having wildcard indicators at the determined column positions, wherein the data structure omits columns at the determined positions;
analyzing the data structure to determine if the represented constraints are violated, the analyzing comprising:
sequentially analyzing the rows of a first selected column of the plurality of columns to determine a first row of the plurality of rows having a value matching a value, or being within a domain, of the first selected column;
setting a putative minimum index of a first valid tuple for the table as an index of the determined first row;
analyzing a value of a second selected column at the determined first row to determine if the value matches a value, or is within a domain, of the second selected column;
determining that the value of the second selected column at the determined first row does not match a value, or is within a domain, of the second selected column;
sequentially analyzing the rows of the second selected column to determine a second row of the plurality of rows having a value matching a value or being within a domain of the second selected column;
setting the putative minimum index of the first valid tuple for the table as an index of the determined second row;
determining a value for the minimum index of the first valid tuple of the table as an index of a third row of the plurality of rows, where the third row is the second row or a row of the table other than the first row and the second row, where column values for the plurality of column for the third row match a value, or are within a domain, of the respective columns, or determining that the table does not comprise a valid tuple; and
sending an indication of whether the represented constraints are violated.

18. The method of claim 17, the operations further comprising:
receiving a domain or single value for any remaining columns of the plurality of columns;
determining whether the domains and single values of the plurality of columns are associated with at least one tuple indicated in the data structure;
sending an indication of whether the set of constraints is entailed based on the determining.

19. The computing system of claim 17, the operations further comprising:
determining that no valid tuple is indicated in the data structure; and
sending an indication that the set of constraints is entailed.

20. The computing system of claim 17, the operations further comprising:
determining at one domain value that can be removed from a domain of a column of the plurality of columns.

* * * * *